(12) United States Patent
Kim

(10) Patent No.: US 8,778,530 B2
(45) Date of Patent: Jul. 15, 2014

(54) BATTERY AND BATTERY PACK USING THE SAME

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 226 days.

(21) Appl. No.: 13/163,360

(22) Filed: Jun. 17, 2011

(65) Prior Publication Data

US 2012/0064387 A1 Mar. 15, 2012

Related U.S. Application Data

(60) Provisional application No. 61/381,691, filed on Sep. 10, 2010.

(51) Int. Cl.
- H01M 2/02 (2006.01)
- H01M 2/24 (2006.01)
- H01M 6/42 (2006.01)

(52) U.S. Cl.
USPC .......................................... 429/179; 429/158

(58) Field of Classification Search
CPC ............ H01M 2/02; H01M 2/24; H01M 6/42
USPC ......... 429/151, 158, 161, 170, 179, 180, 178, 429/162
See application file for complete search history.

(56) References Cited

U.S. PATENT DOCUMENTS

| | | | |
|---|---|---|---|
| 5,104,752 | A | 4/1992 | Baughman et al. |
| 5,998,060 | A | 12/1999 | McGrady |
| 2004/0258985 | A1 | 12/2004 | Tsai |
| 2005/0208375 | A1 | 9/2005 | Sakurai |
| 2006/0091855 | A1 | 5/2006 | Seo |
| 2008/0220315 | A1 | 9/2008 | Dougherty et al. |
| 2010/0159319 | A1 | 6/2010 | Gilford |
| 2010/0173178 | A1 | 7/2010 | Kim et al. |

FOREIGN PATENT DOCUMENTS

| | | | | |
|---|---|---|---|---|
| CN | 201289880 Y | 8/2009 | | |
| JP | 61-53852 U | 4/1986 | | |
| JP | 2001-135358 A | 5/2001 | | |
| JP | 2001135358 A | * 5/2001 | ............ | H01M 10/40 |
| JP | 2003-234129 | 8/2003 | | |
| JP | 2004-071173 A | 3/2004 | | |
| JP | 2005-268004 A | 9/2005 | | |
| JP | 2008-533682 A | 8/2008 | | |

(Continued)

OTHER PUBLICATIONS

English Translation of Japanese patent JP2001135358 A Wantanabe et al.*

(Continued)

*Primary Examiner* — Patrick Ryan
*Assistant Examiner* — Kiran Quraishi
(74) *Attorney, Agent, or Firm* — Lee & Morse, P.C.

(57) ABSTRACT

A battery includes a case, an electrode assembly located within the case and comprising first and second electrodes, a first terminal electrically connected with the first electrode, and a second terminal electrically connected with the second electrode. The first and second terminals project through the case. One of the first and second terminals has first and second connection formations. The first and second connection formations have mutually different shapes and are located on respectively different aspects of the case.

23 Claims, 16 Drawing Sheets

(56) References Cited

FOREIGN PATENT DOCUMENTS

| | | |
|---|---|---|
| JP | 2009-188095 A | 8/2009 |
| JP | 2011-071053 A | 4/2011 |
| KR | 10-2001-0048096 A | 6/2001 |
| KR | 10-2006-0037604 A | 5/2006 |
| KR | 10-2010-0081508 A | 7/2010 |

OTHER PUBLICATIONS

European Search Report in EP 11179109.1-2119, dated Feb. 10, 2012.
Chinese Office Action dated Dec. 4, 2013.
Korean Notice of Allowance dated Jun. 24, 2013.
Japanese Office Action dated Jun. 25, 2013.

* cited by examiner

BATTERY AND BATTERY PACK USING THE SAME

CROSS-REFERENCE TO RELATED APPLICATION

The present application claims priority under 35 U.S.C. §119(e) to U.S. Provisional Application No. 61/381,691, filed on Sep. 10, 2010, and entitled: "Plug Type Battery Cell and Battery Pack Using the Same," which is incorporated herein by reference in its entirety.

BACKGROUND

1. Field

Embodiments relate to a battery and a battery pack using the same.

2. Description of the Related Art

Unlike a primary battery that is not chargeable, a secondary battery is rechargeable. Small capacity batteries each having a single unit cell are generally used for various portable electronic devices, e.g., phones, laptop computers, and camcorders. Large capacity batteries each having a plurality of unit cells are generally used as the power source for driving motors, such as those in electric scooters, hybrid electric vehicles, or electric motor vehicles.

Rechargeable batteries are manufactured in various shapes exemplified by cylindrical and prismatic types. The rechargeable battery is constructed by injecting an electrode assembly including a positive electrode plate, a negative electrode plate and a separator serving as an insulator interposed therebetween, and an electrolyte in a can and installing a cap plate in the case. A positive electrode terminal and a negative electrode terminal are connected to the electrode assembly, which is then exposed or protruded to the outside through the cap plate.

SUMMARY

Some embodiments are directed to providing a battery. The battery may include a case having a bottom surface and sidewalls, at least one electrode assembly in the case, a cover contacting the sidewalls of the case to seal the at least one electrode assembly, and a first bottom terminal region and a first top terminal region connected to the at least one electrode assembly. The first bottom and top terminal regions may protrude through corresponding throughholes in the bottom surface of the case and the cover. The at least one electrode assembly may have a bottom surface area facing the bottom surface of the case, a top surface area facing the cover, and side surface areas facing the sidewalls, the bottom and top surface areas being larger than the side surface areas.

The battery may include a first collector region connected to a first uncoated portion of the at least one electrode assembly, a first bottom extending region extending from the first collector region, the first bottom terminal region protruding from the first bottom extending region, and a first top extending region extending from the first collector region, the first top terminal region protruding from the first top extending region.

The battery may include a second collector region connected to a second uncoated portion of the at least one electrode assembly, the first and second uncoated portions being spaced apart.

The first top terminal region may be connected to a first electrode assembly and the first bottom terminal region may be connected to the first electrode assembly.

The top surface area and the bottom surface area may be arranged in an x direction and a y direction, the at least one electrode assembly may be rolled in the y direction, the first top terminal region and the first bottom terminal region may extend from corresponding top and bottom surface areas in a z direction.

The battery may include a second bottom terminal region connected to the at least one electrode assembly, and a second top terminal region connected to the at least one electrode assembly. The second bottom and top terminal regions may protrude through corresponding throughholes in the bottom surface of the case and the cover.

Structures of the first and second bottom terminal regions may be complementary, and structures of the first and second top terminal regions may be complementary.

The battery may include a second collector region connected to a second uncoated portion of the at least one electrode assembly, a second bottom extending region extending from the second collector region, the second bottom terminal region protruding from the second bottom extending region, and a second top extending region extending from the second collector region, the second top terminal region protruding from the second top extending region.

Structures of the first top and bottom terminal regions may be complementary.

The complementary structures may include a plug type structure and a receptacle type structure.

Some embodiments are directed to providing a battery pack. The battery pack may include at least two batteries, each battery including a case, an electrode assembly in the case, a first terminal electrically connected with the first electrode, and a second terminal electrically connected with the second electrode. The first and second terminals project through the case. One of the first and second terminals includes first and second connection formations. The first and second connection formations have mutually different shapes and are located on respectively different aspects of the case.

At least one first connection formation of a first battery of the at least two batteries and at least one second connection formation of a second battery of the at least two batteries may be in direct contact.

The first connection formation may include a first bottom terminal region and the second connection formation may include a first top terminal region.

The battery pack may include a second bottom terminal region and a second top terminal region connected to the electrode assembly, the second bottom and top terminal regions projecting through the case, the second bottom and first bottom terminal regions having mutually different shapes and the second top and first top terminal regions having mutually different shapes.

The first and second top terminal regions may have complementary structures, and the first and second bottom terminal regions have complementary structures.

The first type structure the first top terminal region of the first battery may be in direct contact with the second type structure of the first bottom terminal region of the second battery, and the second type structure of the second top terminal regions of the first battery may be in direct contact with the first type structure of the second bottom terminal region of the second battery, such that the first and second batteries are connected in parallel.

The battery pack may include a first set of batteries connected in parallel, and a second set of batteries connected in parallel, wherein a single pair of complementary structures of the first and second terminal regions of opposing surfaces of the first and second set of batteries that are in direct contact, such that the first and second sets of batteries are connected in series.

The battery pack may include an insulator between another pair of complementary structures of the first and second terminals of the opposing surfaces of the first and second sets of batteries.

The single pair of complementary structures of the first and second terminal regions of opposing surfaces of the first and second set of batteries may be the only pair of complementary structures on the opposing surfaces of the first and second set of batteries.

The electrode assembly of each battery may have a bottom surface area facing the bottom surface of the case, a top surface area facing the cover, and side surface areas facing the sidewalls, the bottom and top surface areas being larger than the side surface areas.

The top surface area and the bottom surface area may be arranged in an x direction and a y direction, the electrode assembly may be rolled in the y direction, the first top terminal region and the first bottom terminal region extending from corresponding top and bottom faces in a z direction.

The first connection formation may be a plug type structure and the second connection formation may be a receptacle type structure.

Some embodiments are directed to providing a battery. The battery may include a case, an electrode assembly located within the case and including first and second electrodes, a first terminal electrically connected with the first electrode, and a second terminal electrically connected with the second electrode. The first and second terminals project through the case, one of the first and second terminals comprises first and second connection formations, and the first and second connection formations have mutually different shapes and are located on respectively different aspects of the case.

The first connection formation may include a plug and the second connection formation may include a socket.

The first connection formation may project through the case in a direction that is substantially opposite to the direction in which the second connection formation projects through the case.

One of the first and second connection formations may project through a top surface of the case and the other of the first and second connection formations projects through a bottom surface of the case.

The top surface of the case may be defined by a cover.

The case may have a substantially cuboidal shape.

One of the first and second terminals that includes the first and second connection formations may also include a collector portion that is physically connected to an uncoated portion of the electrode to which it is electrically connected.

A pair of extension portions may be connected to the collector portion, each extension portion being provided with a respective one of the first and second connection formations on a respective surface thereof.

The first and second terminals may include third and fourth connection formations having mutually different shapes, which third and fourth connection formations are located on respectively different aspects of the case.

The third connection formation may include a plug and the fourth connection formation may include a socket.

The third connection formation may be located on the same aspect of the case as the second connection formation and the fourth connection formation may be located on the same surface of the case as the first connection formation.

The first connection formation may be located on a first surface of the case and the second connection formation may be located on a second surface of the case.

The first and second surfaces of the case may be mutually opposite.

The first and second surfaces of the case may be orthogonal.

The first and second surfaces of the case may be major surfaces of the case.

The battery cell may include an insulating member between one of the first and second connection formations and a connection formation that forms part of a battery pack to which the said secondary battery cell is to be physically connected.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
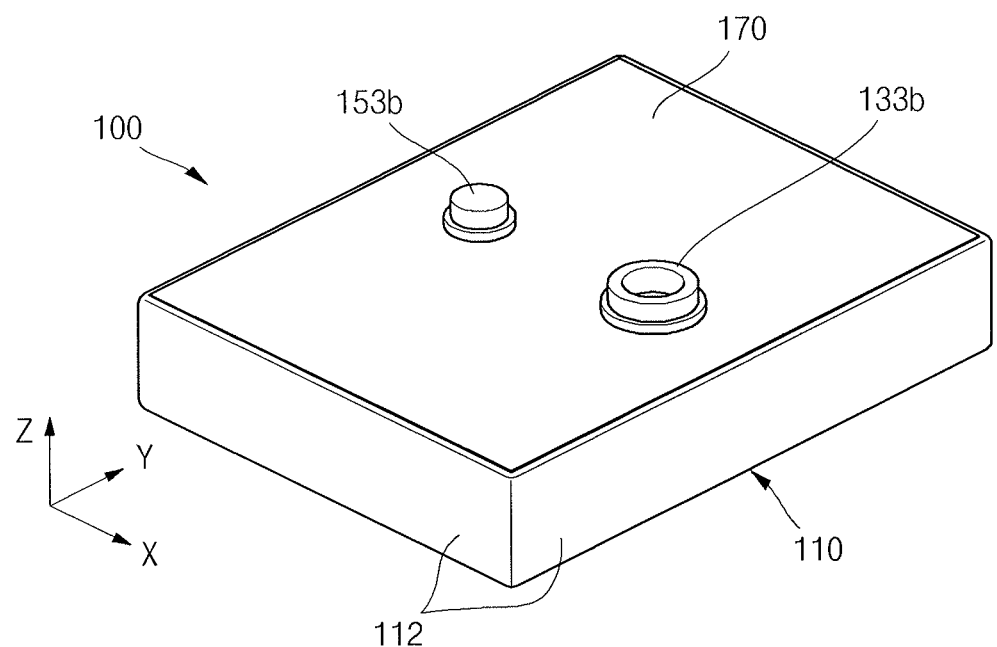
FIG. 1 illustrates a perspective view of a battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Throughout the specification, the same reference numerals refer to the same elements. Further, when it is stated herein that one part is "connected" to another part, the one part may be directly connected to the other part, or the one part and the other part may be electrically connected at respective sides of another device or conductive element.

It will also be understood that, although the terms "first" and "second" etc. may be used herein to describe various elements, structures, components, regions, layers and/or sections, these elements, structures, components, regions, layers and/or sections should not be limited by these terms. These terms are only used to distinguish one element, structure, component, region, layer and/or section from another element, structure, component, region, layer and/or section. Thus, a first element, structure, component, region, layer or section discussed below could be termed a second element, structure, component, region, layer or section without departing from the teachings of exemplary embodiments.

Spatially relative terms, such as "beneath," "below," "lower," "bottom," "above," "upper," "top," and the like, may be used herein for ease of description to describe one element or feature relationship to another element(s) or feature(s) as illustrated in the figures. It will be understood that the spatially relative terms are intended to encompass different orientations of the device in use or operation in addition to the orientation depicted in the figures. For example, if the device in the figures is turned over (or upside down), elements or layers described as "below" or "beneath" other elements or layers would then be oriented "above" the other elements or layers. Thus, the exemplary term "below" can encompass both an orientation of above and below. The device may be otherwise oriented (rotated 90 degrees or at other orientations) and the spatially relative descriptors used herein interpreted accordingly.

Figure 2:
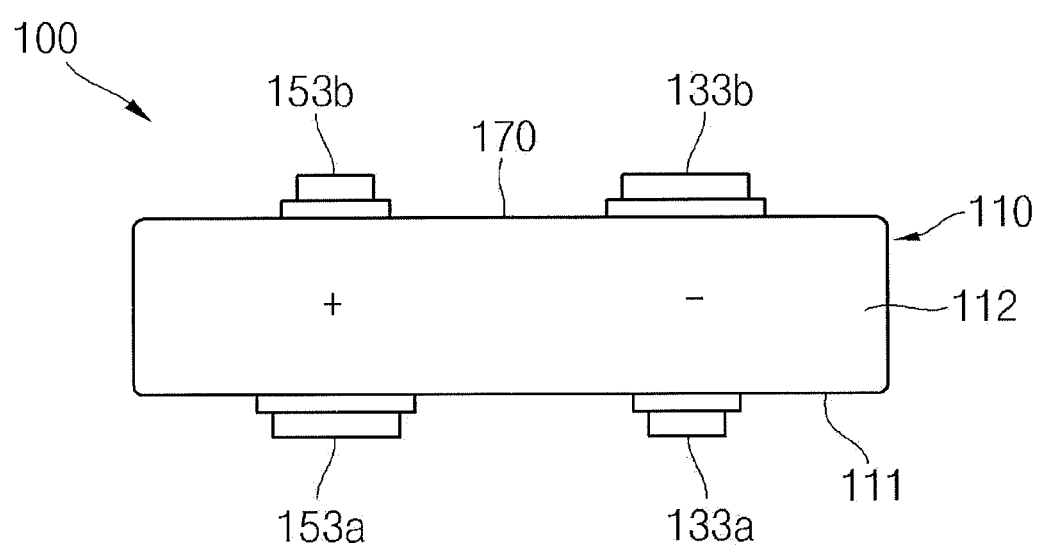
FIG. 2 illustrates a side view of the battery shown in FIG. 1.
Figure 3:
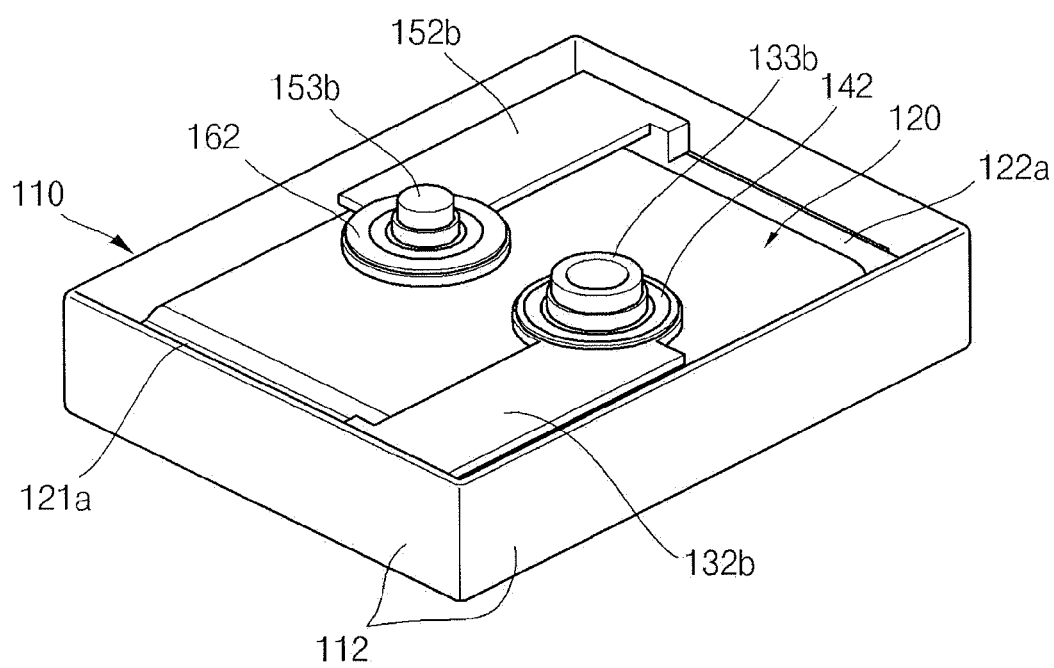
FIG. 3 illustrates a perspective view of a state in which a cover is removed from the battery shown in FIG. 1.
Figure 4:
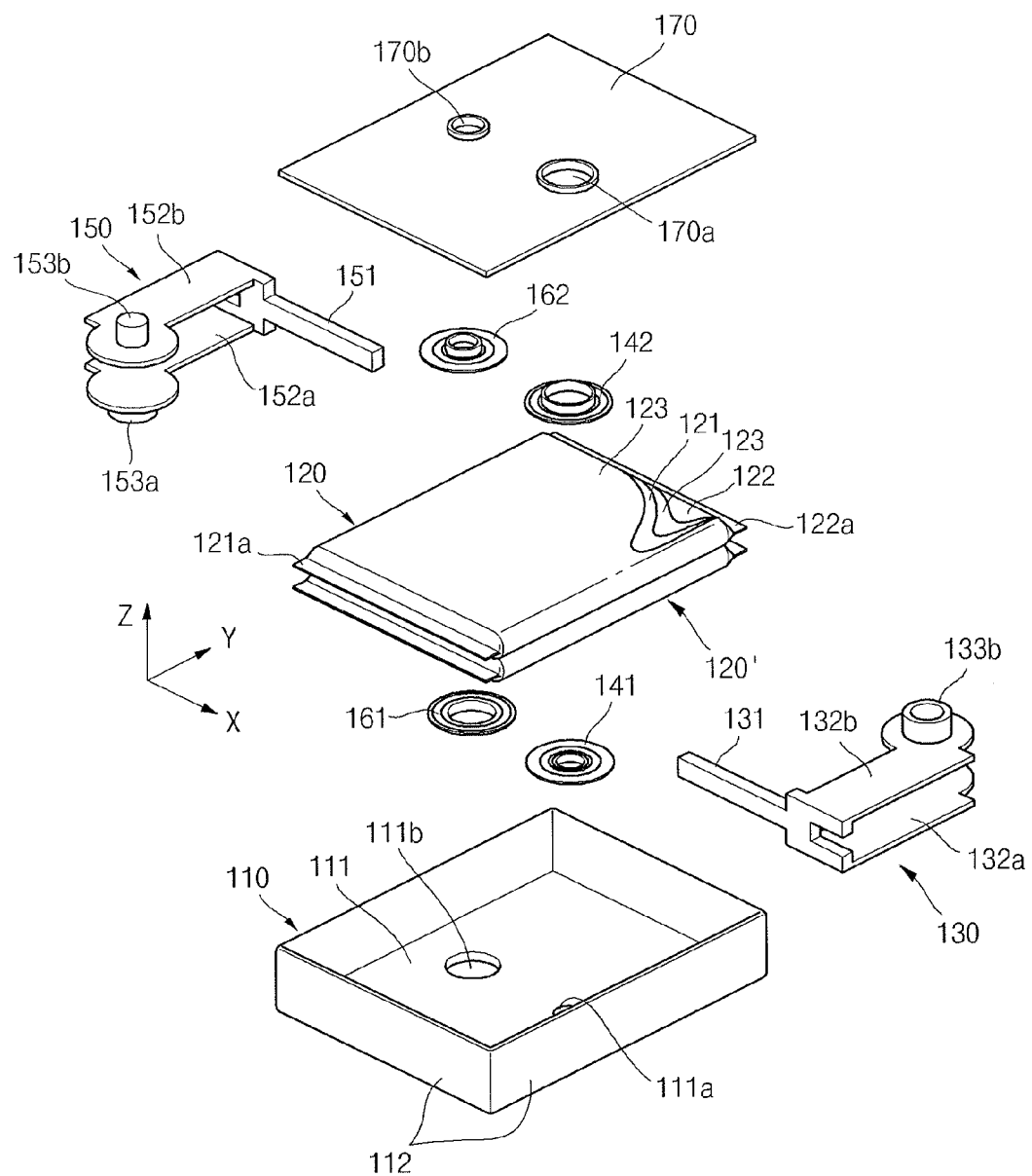
FIG. 4 illustrates an exploded perspective view of the battery shown in FIG. 1.

FIG. 1 illustrates a perspective view of a battery according to an embodiment. FIG. 2 illustrates a side view of the battery shown in FIG. 1. FIG. 3 illustrates a perspective view of a state in which a cover is removed from the battery shown in FIG. 1. FIG. 4 illustrates an exploded perspective view of the battery shown in FIG. 1.

Referring to FIGS. 1 through 4, the battery 100 includes a case 110, an electrode assembly 120, a first terminal 130, first insulation gaskets 141 and 142, a second terminal 150, second insulation gaskets 161 and 162, and a cover 170.

The case 110 has a substantially rectangular bottom surface 111, i.e., a extending in an x-direction and a y-direction, and four sidewalls 112 folded in a substantially upward vertical direction, i.e., a z-direction, from the bottom surface 111. Here, the four sidewalls 112 are also substantially rectangular shaped, and are connected to each other. In addition, an area of the bottom surface 111 is relatively larger than that of one of the sidewalls 112. In some cases, the bottom surface 111 may be called a long side area and the sidewalls 112 may be called a short side area. The bottom surface 111 of the case 110 has a first throughhole 111a and a second throughhole 111b allowing the first terminal 130 and the second terminal 150, which will later be described, to pass therethrough to then protrude downwardly.

Further, an insulation layer (not shown) may be formed on the bottom surface 111 of the case 110 and inner surfaces of the sidewalls 112. The insulation layer prevents electrical shorts between the case 110 and the electrode assembly 120 to be described later, and between the first terminal 130 and the second terminal 150.

More specifically, the insulation layer may be made of at least one of EPDM (ethylene-propylene diene monomer) rubber, NBR (acrylonitrile butadiene rubber), IIR (isobutylene-isoprene rubber), butadiene rubber, SBR (styrene-butadiene rubber), which do not react to an electrolyte, or mixtures of two or more of these rubber materials, but embodiments are not limited thereto. The case 110 may be made of at least one of aluminum, an aluminum alloy, stainless steel, nickel plated steel, and equivalents thereof, but embodiments are not limited thereto.

The electrode assembly 120 may be formed by winding or laminating a stacked structure including a first electrode plate 121 shaped of a thin plate or layer, a separator 123, and a second electrode plate 122, e.g., along the y direction, to form a jelly roll battery (see FIG. 4). In addition, the electrode assembly 120 has a relatively wide long side area facing the bottom surface 111 of the case 110 or the cover 170 to be described later. Further, the electrode assembly 120 has a relatively narrow short side area facing the four sidewalls 112 of the case 110. In addition, the first electrode plate 121 may act as a negative electrode, and second electrode plate 122 may act as a positive electrode, and vice versa. In other words, polarities of the aforementioned first and second electrode plates 121 and 122 may be reversed.

The first electrode plate 121 may be formed by coating a first electrode active material, e.g., graphite or carbon, on a first electrode collector formed of a metal foil, e.g., copper or nickel. The electrode plate 121 may include a first electrode uncoated portion 121a, i.e., a portion not coated with the first electrode active material. The first electrode uncoated portion 121a becomes a path of a current flowing between the first electrode plate 121 and the outside of the first electrode plate 121. However, the material of the first electrode plate 121 is not limited to the example materials described herein.

The second electrode plate 122 may be formed by coating a second electrode active material, e.g., a transition metal oxide, on a second electrode collector formed of a metal foil, e.g., aluminum. The second electrode plate 122 may include a second electrode uncoated portion 122a, i.e., a portion that is not coated with the second electrode active material. The second electrode uncoated portion 122a becomes a path of a current flowing between the second electrode plate 122 and the outside of the second electrode plate 122. However, the material of the second electrode plate 122 is not limited to the example materials described herein.

The separator 123, disposed between the first electrode plate 121 and the second electrode plate 122, serves to prevent electrical shorts and allows passage only to ions, e.g., lithium ions, in the electrolyte to be used in the battery cell 100. The separator 123 may be made of, for example, polyethylene, polypropylene, or a composite film of polyethylene and polypropylene. However, the material of the separator 123 is not limited to the example materials described herein.

The first terminal 130 and the second terminal 150 electrically connected to the first electrode plate 121 and the second electrode plate 122, respectively, are coupled to both ends of the electrode assembly 120.

The electrode assembly 120 is housed in the case 140 together with an electrolyte. The electrolyte may include an organic solvent, e.g., EC (ethylene carbonate), PC (propylene carbonate), DEC (diethyl carbonate), EMC (ethyl methyl carbonate), or DMC (dimethyl carbonate), and a lithium salt, e.g., $LiPF_6$ or $LiBF_4$. In addition, the electrolyte may be a liquid, a solid, or a gel.

In addition, one or more of the electrode assemblies 120 may be provided. That is to say, as shown in FIG. 4, a stack of two electrode assemblies 120 and 120' may be provided. However, embodiments are not limited to any particular number of electrode assemblies illustrated herein.

The first terminal 130 is electrically connected to the first electrode plate 121 of the electrode assembly 120. The first terminal 130 may be made of at least one of copper, a copper alloy, and equivalents thereof, but embodiments are not limited thereto.

More specifically, the first terminal 130 includes a first collector region 131, a pair of spaced-apart first extending regions 132a and 132b, and first bottom and top terminal regions 133a and 133b formed in the first extending regions 132a and 132b. The first bottom and top terminal regions 133a and 133b extend outwardly, i.e., in the z direction, from the first extending regions 132a and 132b.

The first collector region 131 may be formed in a substantially bar shape having a predetermined length and is connected to a first uncoated portion 121a protruding toward one end of the electrode assembly 120. The first collector region 131 may be welded to the first uncoated portion 121a. In particular, the first uncoated portion 121a of the upper electrode assembly 120 may be welded to a top surface of the first collector region 131, and the first uncoated portion 121a of the lower electrode assembly 120 may be welded to a bottom surface of the first collector region 131.

The pair of spaced-apart first extending regions 132a and 132b may be formed substantially in a plate shape having a constant area, and extend a predetermined length substantially toward the center of the battery cell 100 from the first collector region 131. In addition, the first extending regions 132a and 132b are along the long side area of the electrode assembly 120. In particular, one first extending region 132a of the pair of spaced-apart first extending regions 132a and 132b is along the bottom surface of the lower electrode assembly 120', and the other first extending region 132b is along the top surface of the upper electrode assembly 120.

The pair of first terminal regions 133a and 133b protrude outwardly from the first extending regions 132a and 132b, respectively. In particular, the first bottom terminal region 133a passes through the case 110 to then extend downwardly, and the first top terminal region 133b passes through the cover 170 to then extend upwardly.

The pair of first terminal regions 133a and 133b may have complementary mating structures. For example, the first bottom terminal region 133a may have a substantially plug type structure, and the first top terminal region 133b may have a substantially receptacle type structure.

The first insulation gasket 141 passes through the first throughhole 111a provided in the case 110 while substantially covering the first bottom terminal region 133a. Therefore, the first bottom terminal region 133a and the case 110 are electrically insulated from each other. In addition, the first insulation gasket 141 is closely adhered to the bottom surface, i.e., the long side area, of the lower electrode assembly 120'.

The first insulation gasket 142 covers the first top terminal region 133b and passes through a first throughhole 170a provided in the cover 170. Therefore, the first top terminal region 133b and the cover 170 are electrically insulated from each other. In addition, the first insulation gasket 142 is closely adhered to the top surface, that is, the long side area, of the upper electrode assembly 120.

The second terminal 150 is electrically connected to the second electrode plate 122 of the electrode assembly 120. The second terminal 150 may be made of at least one of aluminum, an aluminum alloy, and equivalents thereof, but embodiments are not limited thereto.

More specifically, the second terminal 150 includes a second collector region 151, a pair of spaced-apart second extending regions 152a and 152b, and second bottom and top terminal regions 153a and 153b formed in the second extending regions 152a and 152b. The second bottom and top terminal regions 153a and 153b extend outwardly, i.e., in the z direction, from the second extending regions 152a and 152b.

The second collector region 151 may be formed in a substantially bar shape having a predetermined length and is connected to a second uncoated portion 122a protruding toward the other end of the electrode assembly 120. The second collector region 151 may be welded to the second uncoated portion 122a. In particular, the second uncoated portion 122a of the upper electrode assembly 120 may be welded to a top surface of the second collector region 151, and the second uncoated portion 122a of the lower electrode assembly 120 may be welded to a bottom surface of the second collector region 151.

The pair of spaced-apart second extending regions 152a and 152b may be formed substantially in a plate shape having a constant area, and extend a predetermined length substantially toward the center of the battery cell 100 from the second collector region 151. In addition, the second extending regions 152a and 152b are along the long side area of the electrode assembly 120. In particular, one second extending region 152a of the pair of spaced-apart second extending regions 152a and 152b is along the bottom surface of the lower electrode assembly 120', and the other second extending region 152b is along the top surface of the upper electrode assembly 120.

The pair of second terminal regions 153a and 153b outwardly protrude from the second extending regions 152a and 152b, respectively, along the z direction. In particular, the second bottom terminal region 153a passes through the case 110 to then extend downwardly in the z direction, and the second top terminal region 153b passes through the case 110 to then extend upwardly along the z direction.

The pair of second terminal regions 153a and 153b may have complementary mating structures. More specifically, the second bottom terminal region 153a may have a substantially receptacle type structure, and the second top terminal region 153b may have a substantially plug type structure. Further, the first and second bottom terminal regions 133a, 153a may have complementary mating structures and the first and second top terminal regions 133b, 153b may have complementary mating structures.

The second insulation gasket 161 passes through the second throughhole 111b provided in the case 110 while substantially covering the second bottom terminal region 153a. Therefore, the second bottom terminal region 153a and the case 110 are electrically insulated from each other. In addition, the second insulation gasket 161 is closely adhered to the bottom surface, i.e., the long side area, of the lower electrode assembly 120'.

The second insulation gasket 162 passes through the second throughhole 170b provided in the cover 170 while substantially covering the second top terminal region 153b. Therefore, the second top terminal region 153b and the cover 170 are electrically insulated from each other. In addition, the second insulation gasket 162 is closely adhered to the bottom surface, i.e., the long side area, of the upper electrode assembly 120.

The cover 170 is formed in a substantially rectangular plate shape and covers the case 110. That is to say, four sides of the cover 170 are coupled to the four sidewalls 112 of the case 110, respectively, e.g., by laser welding. Therefore, the electrode assembly 120, the first terminal 130, the first insulation gaskets 141 and 142, the second terminal 150, the second insulation gaskets 161 and 162, and an electrolyte (not shown) are hermetically sealed by the case 110 and the cover 170. In addition, the cover 170 includes the first throughhole 170a and the second throughhole 170b allowing the first terminal 130 and the second terminal 150 to pass therethrough and to be coupled thereto. The first insulation gasket 142 is disposed in the first throughhole 170a, and the second insulation gasket 162 is disposed in the second throughhole 170b. Further, the case 110 may include an insulation layer (not shown) formed on the bottom surface thereof facing the electrode assembly 120. The insulation layer prevents electrical shorts between the cover 170 and the electrode assembly 120 and between the first terminal 130 and the second terminal 150.

The insulation layer may be made of at least one of EPDM (ethylene-propylene diene monomer) rubber, NBR (acrylonitrile butadiene rubber), IIR (isobutylene-isoprene rubber), butadiene rubber, SBR (styrene-butadiene rubber), which do not react to an electrolyte, or mixtures of two or more of these rubber materials, but embodiments are not limited thereto. The cover 170 may be made of at least one of aluminum, an aluminum alloy, stainless steel, nickel plated steel, and equivalents thereof, but embodiments are not limited thereto.

Figure 5A:
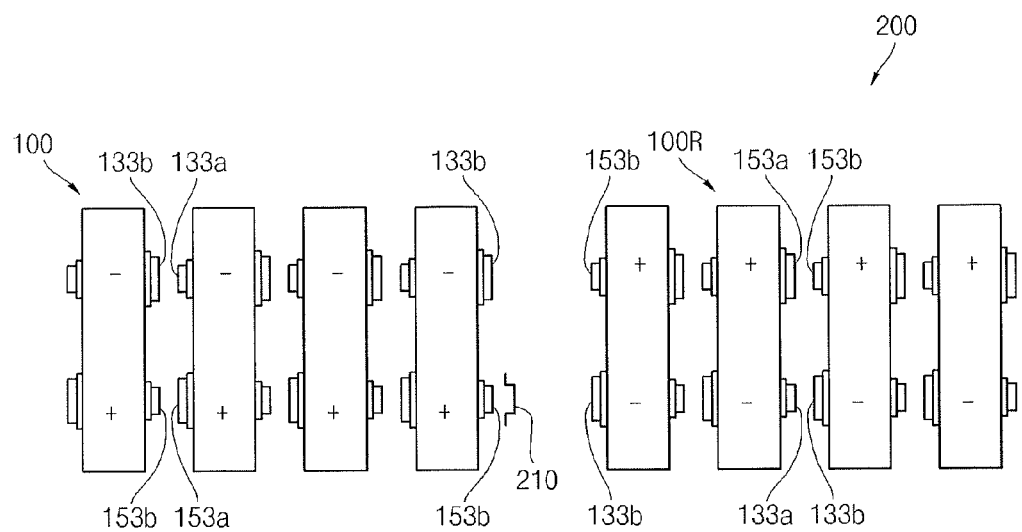
FIGS. 5A and 5B illustrate side views of states in which a battery pack is yet to be assembled and a battery pack is assembled using a battery according to an embodiment.
Figure 5B:
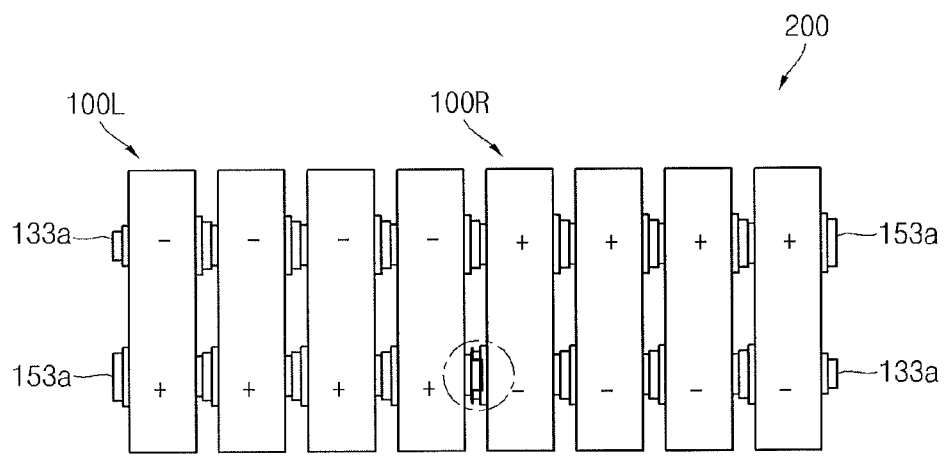
Figure 5C:
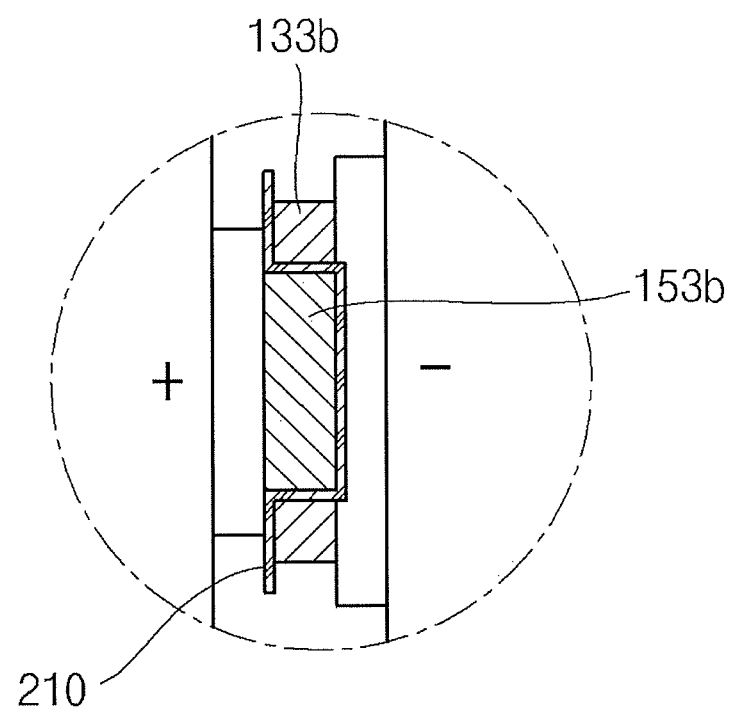
FIG. 5C is a partially enlarged sectional view of FIG. 5B.

FIGS. 5A and 5B illustrate side views of states in which a battery pack 200 is yet to be assembled and the battery pack 200 is assembled using a battery according to an embodiment. FIG. 5C illustrates a partially enlarged sectional view of FIG. 5B.

As shown in FIGS. 5A and 5B, in the battery pack 200, a plurality of battery cells 100 can be connected in series and/or parallel to each other without using a bus bar. In an exemplary embodiment, as shown in FIGS. 5A and 5B, four left battery cells 100L may be connected in parallel, and four right battery cells 100R may be connected in parallel. In addition, left battery cells 100L and right battery cells 100R may be connected in series to each other.

More specifically, amongst the four left battery cells 100L, the first bottom terminal region 133a of one battery cell 100 is coupled to the first top terminal region 133b of an adjacent battery cell 100. In addition, the second bottom terminal region 153a of one battery cell 100 is coupled to the second top terminal region 153b of an adjacent battery cell 100. In such a manner, a plurality of battery cells 100 of the four left battery cells 100L may be connected in parallel to each other.

In addition, amongst the four right battery cells 100R, the first bottom terminal region 133a of one battery cell 100 is coupled to the first top terminal region 133b of an adjacent battery cell 100. In addition, the second bottom terminal region 153a of one battery cell 100 is coupled to the second top terminal region 153b of an adjacent battery cell 100. In such a manner, a plurality of battery cells 100 of the four right battery cells 100R may be connected in parallel to each other.

In a structure in which the left battery cells 100L and the right battery cells 100R are connected in series to each other, only one pair of terminal mating regions in opposing faces of battery cells to be connected, may be coupled. For example, only one second top terminal region 153b in a leftmost battery cell of the right battery cells 100R and one first top terminal region 133b in a rightmost battery cell of the left battery cells 100L may be electrically connected to each other. An insulator 210 may be provided between another first top terminal region 133b of the leftmost battery cell in the right battery cells 100R and another second terminal top region 153b of the rightmost battery cell of the left battery cells 100L, such that these regions are not electrically connected to each other, as illustrated in detail in FIG. 5C. The insulator 210 may be at least one of a general insulating adhesive, an insulating film, an insulating tape, and equivalents thereof, but embodiments are not limited thereto. In such a manner, the right battery cells 100R and the left battery cells 100L are connected in series to each other.

Figure 6A:
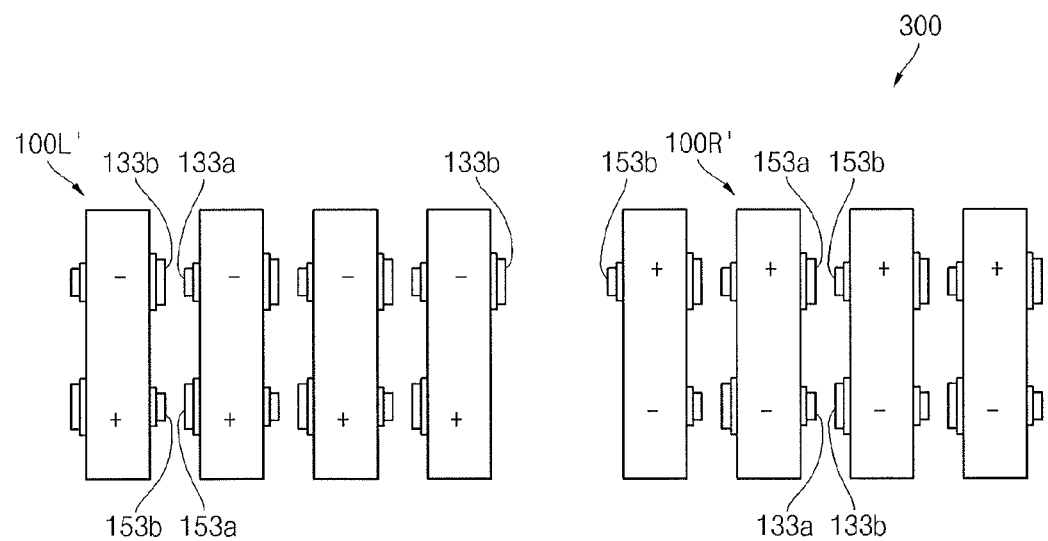
FIGS. 6A and 6B illustrate side views of states in which a battery pack is yet to be assembled and a battery pack is assembled using a battery according to another embodiment.
Figure 6B:
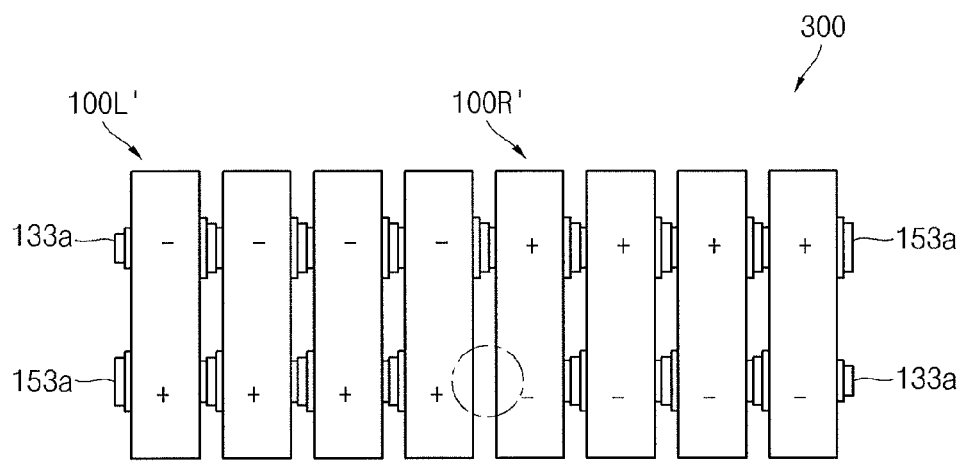
Figure 6C:
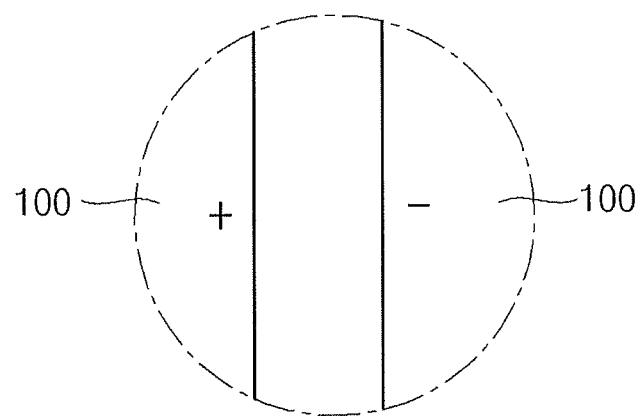
FIG. 6C is a partially enlarged sectional view of FIG. 6B.

FIGS. 6A and 6B illustrate side views of states in which a battery pack 300 is yet to be assembled and the battery pack 300 is assembled using a battery according to another embodiment. FIG. 6C illustrates a partially enlarged sectional view of FIG. 6B.

As shown in FIGS. 6A and 6B, in the battery pack 300, a plurality of battery cells 100 can be connected in series and/or parallel to each other without using a bus bar. In an exemplary embodiment, as shown in FIGS. 6A and 6B, four left battery cells 100L' may be connected in parallel and four right battery cells 100R' may be connected in parallel. In addition, left battery cells 100L' and right battery cells 100R' may be connected in series to each other.

As shown in FIGS. 6A, 6B and 6C, the second top terminal region 153b of a leftmost battery cell of the right battery cells 100R' and the first top terminal region 133b of rightmost battery cell of the left battery cells 100L' are connected to each other. However, another second first top terminal region is not on the leftmost battery cell of the right battery cell 100R' and/or another second top terminal region is not on the rightmost battery cell of the left battery cells 100L'. In such a manner, the right battery cells 100R' and the left battery cells 100L' may be connected in series to each other without an insulator (210 of FIG. 5C) while still preventing terminals from being electrically connected to each other.

Figure 7:
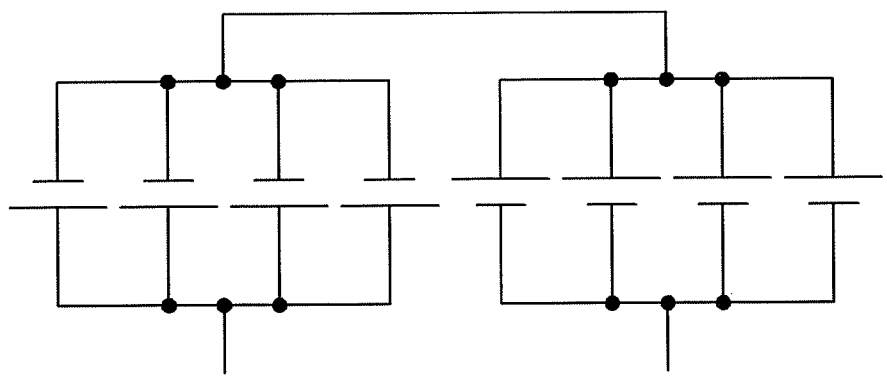
FIG. 7 illustrates an equivalent circuit diagram of a battery pack according to an embodiment.

FIG. 7 illustrates an equivalent circuit diagram of a battery pack according to an embodiment. As shown in FIG. 7, the battery pack according to the illustrated embodiment has the same circuit configuration as that of the battery pack shown in FIG. 5B or 6B, in which four left battery cells are connected in parallel, four right battery cells are connected in parallel, and the left battery cells and the right battery cells are connected in series to each other. According to the illustrated embodiment, the battery pack may have various electrical connection structures in addition to the above-described structure, such that embodiments are not limited to those illustrated herein.

Figure 8:
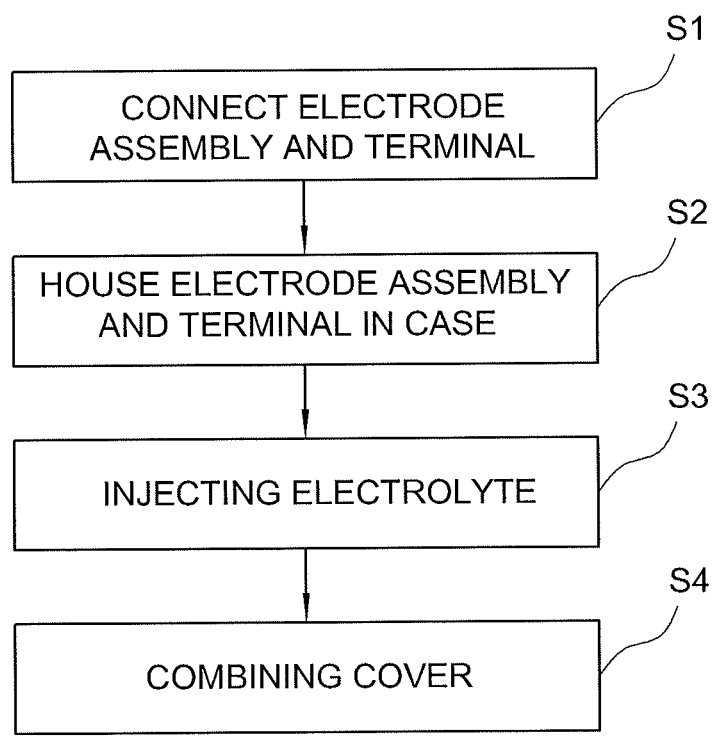
FIG. 8 illustrates a flowchart of a method of manufacturing a battery cell according to an embodiment.

FIG. 8 illustrates a flowchart of a method of manufacturing a battery cell according to an embodiment. As shown in FIG. 8, the method of manufacturing a battery cell according to the embodiment includes connecting an electrode assembly and a terminal (S1), housing the electrode assembly and the terminal in a case (S2), injecting an electrolyte (S3), and combining a cover (S4).

Figure 9A:
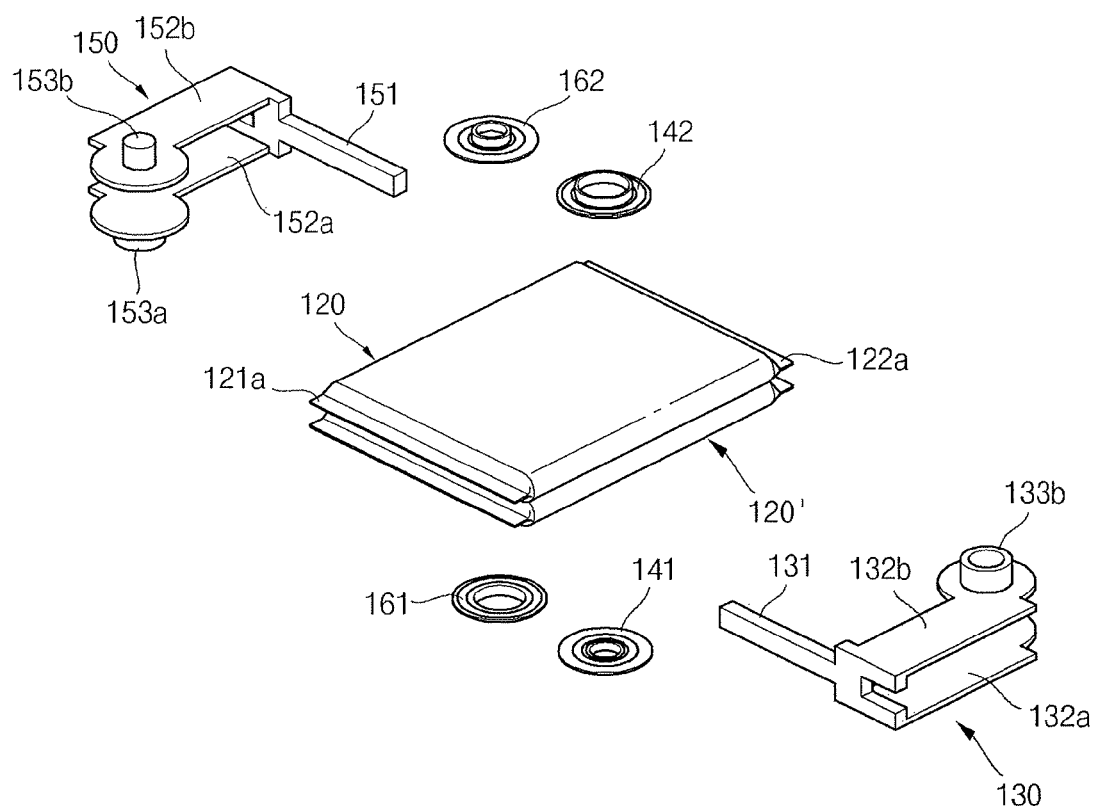
FIGS. 9A through 9D illustrate perspective views of the method of manufacturing a battery cell according to an embodiment.

FIGS. 9A through 9D illustrate perspective views in stages of a method of manufacturing a battery cell according to an embodiment. As shown in FIG. 9A, in connecting an electrode assembly and a terminal (S1), at least one electrode assembly 120 is prepared, and a first terminal 130 and a second terminal 150 are electrically connected to the electrode assembly 120.

Here, the first terminal 130 includes a first collector region 131, a pair of spaced-apart first extending regions 132a and 132b, and first terminal regions 133a and 133b formed in the first extending regions 132a and 132b and extending outwardly, respectively. The first collector region 131 of the first terminal 130 is electrically connected to a first uncoated portion 121a extending from a first electrode plate 121 of the electrode assembly 120. For example, the first uncoated portion 121a may be welded to the first collector region 131.

The second terminal 150 may include a second collector region 151, a pair of spaced-apart second extending regions 152a and 152b, and second terminal regions 153a and 153b formed in the second extending regions 152a and 152b and extending outwardly, respectively. The second collector region 151 of the second terminal 150 may be electrically connected to a second uncoated portion 122a extending from a second electrode plate 122 of the electrode assembly 120. For example, the second uncoated portion 122a may be welded to the second collector region 151.

Figure 9B:
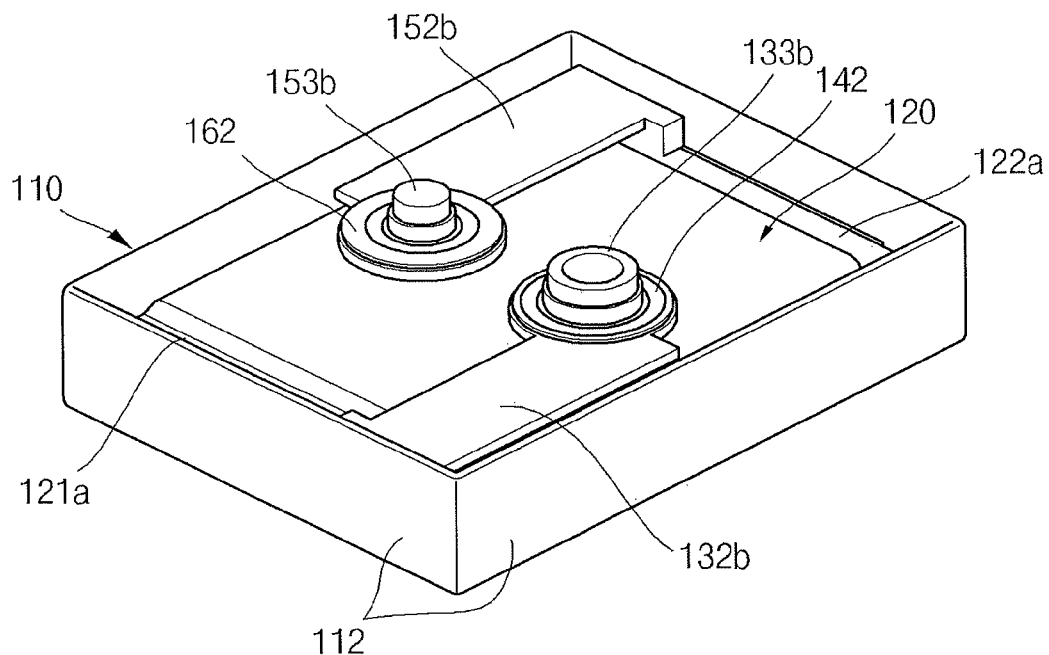

As shown in FIG. 9B, in housing the electrode assembly and the terminal in a case (S2), the electrode assembly 120, the first terminal 130 and the second terminal 150 are housed in the case 110 having a bottom surface 111 and four sidewalls 112. First insulation gaskets 141 and 142 are coupled to a pair of first terminal regions 133a and 133b of the first terminal 130, and second insulation gaskets 161 and 162 are coupled to a pair of second terminal regions 153a and 153b of the second terminal 150. In addition, the first terminal region 133a and the first insulation gasket 141, and the second terminal region 153a and the second insulation gasket 161, positioned under the electrode assembly 120, are coupled to a first throughhole 111a and a second throughhole 111b provided on the bottom surface 111 of the case 110, respectively.

Figure 9C:
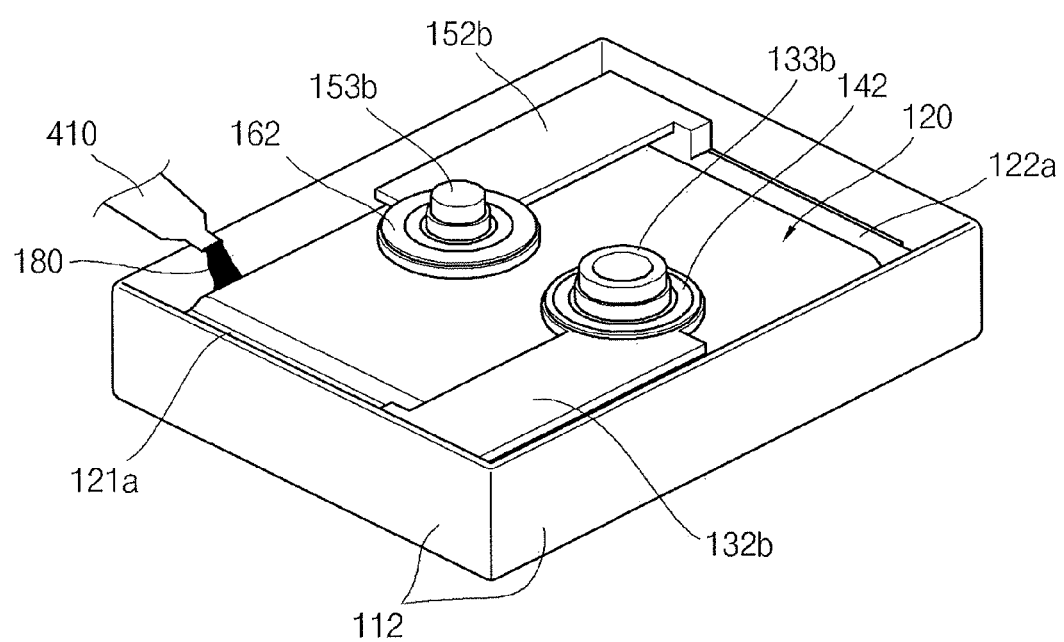

As shown in FIG. 9C, in injecting an electrolyte (S3), a predetermined amount of the electrolyte 180 is injected into the case 110 using an electrolyte injection tool 410. Alternatively, the electrolyte 180 may be provided in a state in which it is impregnated into the electrode assembly 120. In such a case, injecting an electrolyte (S3) may be omitted. As a further alternative, injecting an electrolyte (S3) may be performed after combining a cover (S4), which will later be described. In this alternative, a separate opening (not shown) may be previously formed in the case 110 or the cover 170, and an electrolyte may be injected through the opening. After the electrolyte is injected, the opening is closed using a plug (not shown).

Figure 9D:
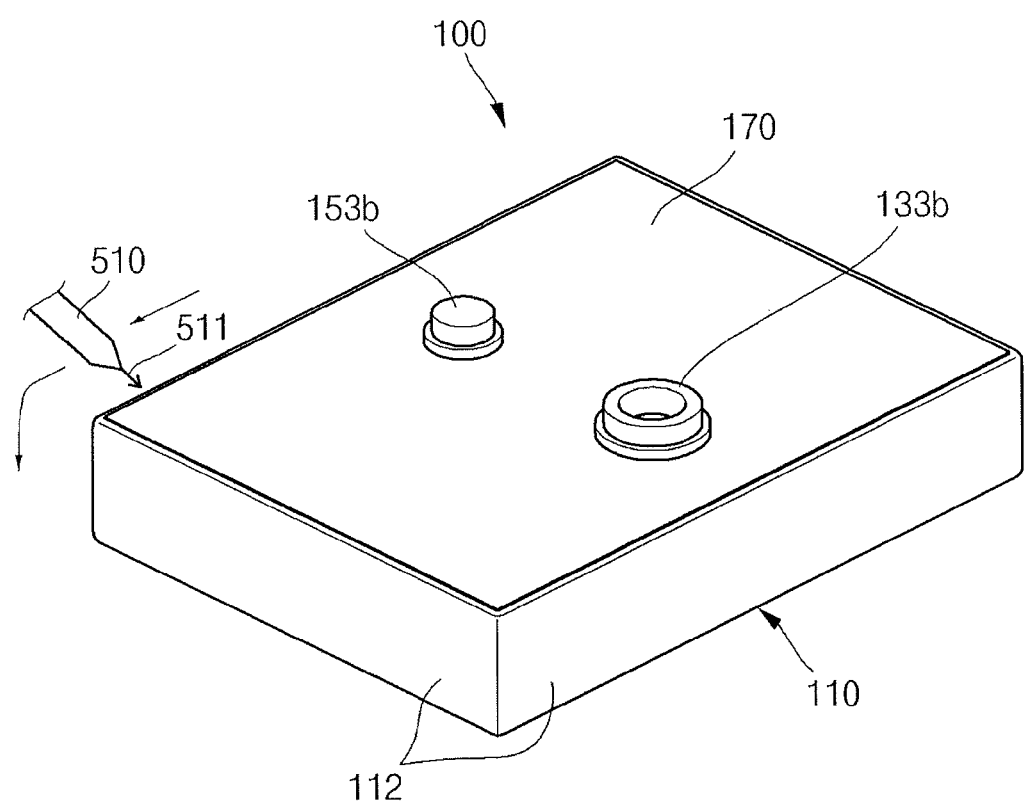

As shown in FIG. 9D, in combining a cover (S4), the cover 170 is secured to the case 110. Here, the first terminal region 133b and the first insulation gasket 142, and the second terminal region 153b and the second insulation gasket 162, positioned on the electrode assembly 120, are coupled to a first throughhole 170a and a second throughhole 170b provided on the cover 170, respectively.

In addition, boundary portions formed by four edges of the cover 170 and four sidewalls 112 of the case 110 may be secured, e.g., welded by laser beam 511 using a laser welding tool 510, thereby combining the cover 170 with the case 110.

In addition to the laser welding tool, an ultra welding tool, for example, may also be used. Further, the cover 170 may also be secured to the case 110 by a separate adhesive. Thus, combining of the case 110 and the cover 170 is not limited to those examples illustrated herein.

Figure 10A:
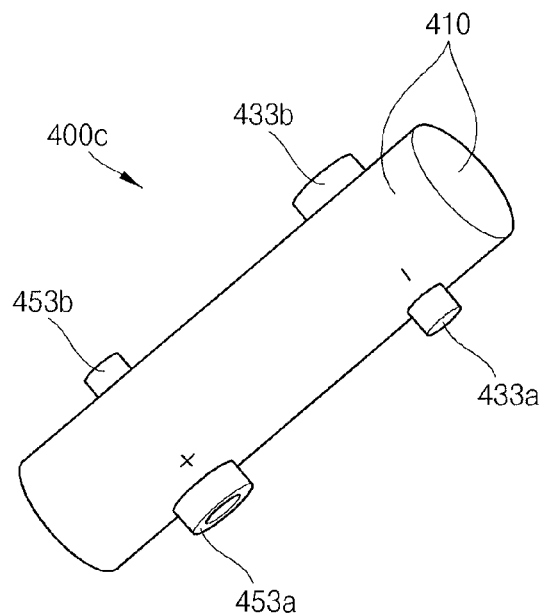
FIG. 10A illustrates a perspective view of a battery according to another embodiment and FIG. 10B illustrates a state in which a plurality of battery cells are connected to each other.
Figure 10B:
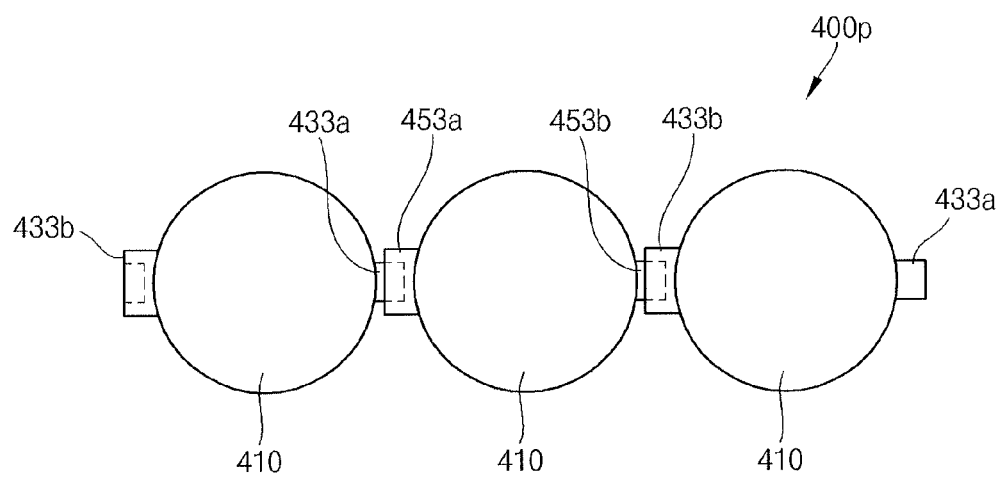

FIG. 10A illustrates a perspective view of a battery according to another embodiment and FIG. 10B illustrates a state in which a battery pack is assembled using the battery shown in FIG. 10A.

As shown in FIG. 10A, the battery 400c may have a substantially cylindrical shape. In an exemplary embodiment, the battery 400c includes a substantially cylindrical case 410, one first terminal region 433a and the other first terminal region 433b, and one second terminal region 453a and the other second terminal region 453b.

Here, the one first terminal region 433a and the other first terminal region 433b may have different shapes and may be located at different positions while having the same polarity, for example, a first polarity (e.g., a negative electrode). For example, the one first terminal region 433a may have a substantially receptacle type structure, and the other first terminal region 433b may have a substantially plug type structure. In addition, structures of the one first terminal region 433a and the other first terminal region 433b may be complementary. In addition, the one first terminal region 433a and the other first terminal region 433b may be positioned at opposite regions.

The one second terminal region 453a and the other second terminal region 453b may have different shapes and may be located at different positions while having the same polarity, for example, a second polarity (e.g., a positive electrode). For example, the one second terminal region 453a may have a substantially receptacle type structure, and the other second terminal region 453b may have a substantially plug type structure. In addition, structures of the one second terminal region 453a and the other second terminal region 453b may be complementary. In addition, the one second terminal region 453a and the other second terminal region 453b may be positioned at opposite regions.

Here, the one first terminal region 433a and the one second terminal region 453a may have complementary structures and may be formed toward the same direction.

As shown in FIG. 10B, the battery pack 400p may include a plurality of batteries 400c, each shown in FIG. 10A, connected in series and/or parallel to each other. FIG. 10B shows that the plurality of batteries 400c are connected in series to each other.

For example, a one first terminal region 433a of one of the plurality of batteries may be mechanically, electrically connected to a one second terminal region 453a of another battery. In addition, the other second terminal region 453b of another battery may be mechanically, electrically connected to the other first terminal region 433b of still another battery. In such a manner, the plurality of batteries may be connected to each other, thereby forming the battery pack 400p.

Figure 11A:
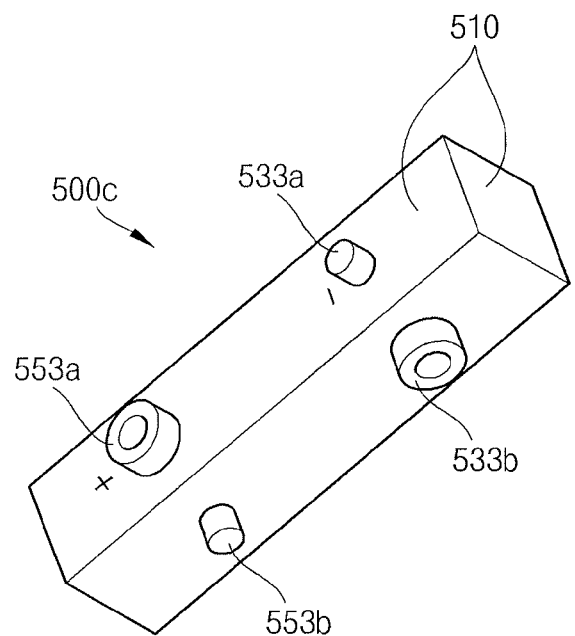
FIG. 11A illustrates a perspective view of a battery according to another embodiment and FIG. 11B illustrates a state in which a plurality of battery cells are connected to each other.
Figure 11B:
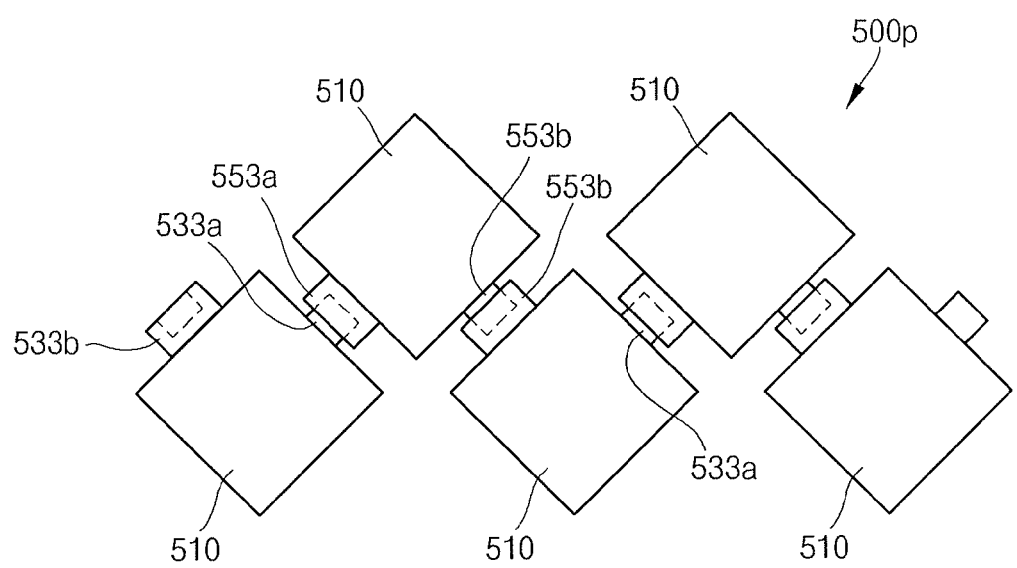

FIG. 11A illustrates a perspective view of a battery according to another embodiment and FIG. 11B illustrates a state in which a battery pack is assembled using the battery shown in FIG. 11A.

As shown in FIG. 11A, the battery 500c may have a substantially prismatic (square or rectangular) shape. In an exemplary embodiment, the battery 500c includes a substantially prismatic case 510, one first terminal region 533a and the other first terminal region 533b, and one second terminal region 553a and the other second terminal region 553b.

Here, the one first terminal region 533a and the other first terminal region 533b may have different shapes and may be located at different positions while having the same polarity, for example, a first polarity (e.g., a negative electrode). For example, the one first terminal region 533a and the other first terminal region 533b may be positioned on different surfaces. That is to say, a surface where the one first terminal region 533a is formed may be substantially perpendicular to a surface where the other first terminal region 533b is formed.

The one second terminal region 553a and the other second terminal region 553b may have different shapes and may be located at different positions while having the same polarity, for example, a second polarity (e.g., a positive electrode). For example, the one second terminal region 553a and the other second terminal region 553b may be positioned on different surfaces. That is to say, a surface where the one second terminal region 553a is formed may be substantially perpendicular to a surface where the other second terminal region 553b is formed.

As shown in FIG. 11B, the battery pack 500p may include a plurality of batteries 500c, each shown in FIG. 11A, connected in series and/or parallel to each other. For example, a one first terminal region 533a of one of the plurality of batteries may be mechanically, electrically connected to a one second terminal region 553a of another battery. In addition, the other second terminal region 553b of another battery may be mechanically, electrically connected to the other first terminal region 533b of still another battery.

Figure 12A:
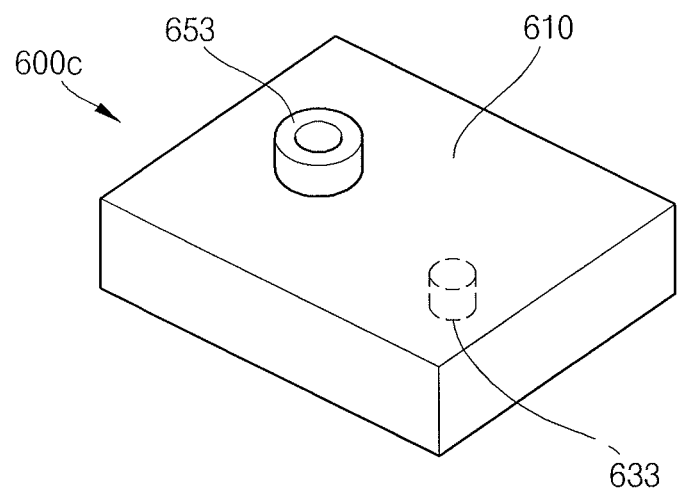
FIG. 12A illustrates a perspective view of a battery according to another embodiment and FIG. 12B illustrates a state in which a plurality of battery cells are connected to each other.
Figure 12B:
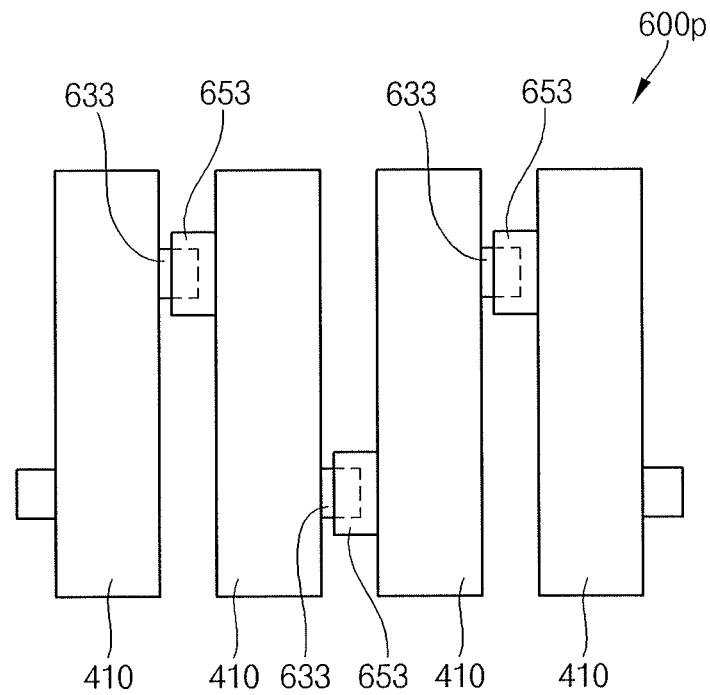

FIG. 12A illustrates a perspective view of a battery according to another embodiment and FIG. 12B illustrates a state in which a battery pack is assembled using the battery shown in FIG. 12A.

As shown in FIGS. 12A and 12B, the battery 600c may be a thin prismatic battery. In practice, the battery 600c is substantially the same as the battery 100 shown in FIG. 1, except for terminal regions. That is to say, the battery 600c includes one terminal region 633 formed on one surface of a case 610 and the other terminal region 653 formed on the other surface of the case 610.

Here, the one terminal region 633 and the other terminal region 653 may have different polarities and different shapes. For example, the one terminal region 633 may be a positive electrode and the other terminal region 653 may be a negative electrode. In addition, the one first terminal region 633 may have a substantially receptacle type structure, and the other first terminal region 653 may have a substantially plug type structure. In addition, structures of the one first terminal region 633 and the other first terminal region 653 may be complementary.

As shown in FIG. 12B, the battery pack 600p may include a plurality of batteries 600c, each shown in FIG. 12A, connected in series to each other. For example, a one first terminal region 633 of one of the plurality of batteries may be mechanically, electrically connected to a one second terminal region 653 of another battery. In addition, the other second terminal region 653 of another battery may be mechanically, electrically connected to the other first terminal region 633 of still another battery. In such a manner, the plurality of batteries may be connected in series to each other, thereby forming the battery pack 600p.

By way of summary and review, a battery cell according to embodiments and a battery pack using the same, may have a plurality of battery cells connected in series and/or parallel to each other by first and second connection formations connected to a terminal projecting through the case, instead of using a bus bar. These connection formations have mutually different shapes and are located on respectively different aspects, i.e., positions, of the case. For example, the first and second connection formations may be on a same side of the case, on opposite sides of the case, or on orthogonal sides of the case.

In addition, in a battery cell according to the embodiments and a battery pack using the same, since an area of swelling potential in the electrode assembly is directly pressed by the terminal, sealability of the electrode assembly can be improved and swelling of the battery cell can be suppressed.

Meanwhile, the above-described battery cells and manufacturing method thereof are provided for illustration only and embodiments are not limited to the battery cells and manufacturing method illustrated hereinabove. For example, a variety of safety devices, including a safety vent, an overcharge preventing device, a fuse, and so on, may be additionally provided in the battery cell. In addition, the terminals provided in the battery cell having plug and receptacle type structures may be modified in various forms of mating terminals that are not illustrated herein, such that the foregoing disclosure does not limit the terminal structures to those illustrated herein.

Although a battery according to exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
   a case;
   an electrode assembly located within the case and comprising first and second electrodes;
   a first terminal electrically connected with the first electrode; and
   a second terminal electrically connected with the second electrode; wherein
   the first and second terminals project through the case,
   one of the first and second terminals has first and second connection formations,
   the first and second connection formations have mutually different shapes,
   the first and second connection formations both protrude from the case away from the electrode assembly, and
   the first and second connection formations are located on respectively different aspects of the case.

2. The battery as claimed in claim 1, wherein:
   the case has a bottom surface and sidewalls;
   the first connection formation includes a first bottom terminal region;
   the second connection formation includes a first top terminal region,
   the first bottom and top terminal regions project through the bottom surface of the case; and
   the electrode assembly has a bottom surface area facing the bottom surface of the case, a top surface area opposite the bottom surface area, and side surface areas facing the sidewalls, the bottom and top surface areas being larger than the side surface areas.

3. The battery as claimed in claim 2, further comprising:
   a first collector region connected to a first uncoated portion of the electrode assembly;
   a first bottom extending region extending from the first collector region, the first bottom terminal region protruding from the first bottom extending region; and
   a first top extending region extending from the first collector region, the first top terminal region protruding from the first top extending region.

4. The battery as claimed in claim 3, further comprising a second collector region connected to a second uncoated portion of the electrode assembly, the first and second uncoated portions being spaced apart.

5. The battery as claimed in claim 2, wherein the first top terminal region is connected to a first electrode assembly and the first bottom terminal region is connected to the first electrode assembly.

6. The battery as claimed in claim 2, wherein the top surface area and the bottom surface area are arranged in an x direction and a y direction, the electrode assembly being rolled in the y direction, the first top terminal region and the first bottom terminal region extending from corresponding top and bottom surface areas in a z direction.

7. The battery as claimed in claim 2, further comprising:
   a second bottom terminal region connected to the electrode assembly; and
   a second top terminal region connected to the electrode assembly, the second bottom and top terminal regions projecting through the case.

8. The battery as claimed in claim 7, wherein:
   structures of the first and second bottom terminal regions are complementary; and
   structures of the first and second top terminal regions are complementary.

9. The battery as claimed in claim 7, further comprising:
a second collector region connected to a second uncoated portion of the electrode assembly;
a second bottom extending region extending from the second collector region, the second bottom terminal region protruding from the second bottom extending region; and
a second top extending region extending from the second collector region, the second top terminal region protruding from the second top extending region.

10. The battery as claimed in claim 1, wherein structures of the first connection formation and second connection formation are complementary.

11. The battery as claimed in claim 10, wherein complementary structures include a plug type structure and a receptacle type structure.

12. A battery pack, comprising:
at least two batteries, each battery including
a case;
an electrode assembly located within the case and including first and second electrodes;
a first terminal electrically connected with the first electrode; and
a second terminal electrically connected with the second electrode; wherein
the first and second terminals project through the case, one of the first and second terminals has first and second connection formations,
the first and second connection formations have mutually different shapes,
the first and second connection formations both protrude from the case away from the electrode assembly, and
the first and second connection formations are located on respectively different aspects of the case, and
at least one first connection formation of a first battery of the at least two batteries and at least one second connection formation of a second battery of the at least two batteries are in direct contact.

13. The battery pack as claimed in claim 12, wherein:
the first connection formation includes a first bottom terminal region; and
the second connection formation includes a first top terminal region.

14. The battery pack as claimed in claim 13, further comprising:
a second bottom terminal region and a second top terminal region connected to the electrode assembly, the second bottom and top terminal regions projecting through the case, the second bottom and first bottom terminal regions having mutually different shapes and the second top and first top terminal regions having mutually different shapes.

15. The battery pack as claimed in claim 14, wherein:
the first and second top terminal regions have complementary structures; and
the first and second bottom terminal regions have complementary structures.

16. The battery pack as claimed in claim 15, wherein:
the first top terminal region of the first battery is in direct contact with the first bottom terminal region of the second battery; and
the second top terminal region of the first battery is in direct contact with the second bottom terminal region of the second battery, such that the first and second batteries are connected in parallel.

17. The battery pack as claimed in claim 16, further comprising:
a first set of batteries connected in parallel; and
a second set of batteries connected in parallel, wherein
a single pair of complementary structures of the first and second terminal regions of opposing surfaces of the first and second set of batteries are in direct contact, such that the first and second sets of batteries are connected in series.

18. The battery pack as claimed in claim 17, further comprising an insulator between another pair of complementary structures of the first and second terminals of the opposing surfaces of the first and second sets of batteries.

19. The battery pack as claimed in claim 17, wherein the single pair of complementary structures of the first and second terminal regions of opposing surfaces of the first and second set of batteries is the only pair of complementary structures on the opposing surfaces of the first and second set of batteries.

20. The battery pack as claimed in claim 12, wherein structures of the first connection formation and second connection formation are complementary.

21. The battery as claimed in claim 20, wherein complementary structures include a plug type structure and a receptacle type structure.

22. The battery as claimed in claim 1, wherein structures of the first connection formation and second connection formation are complementary and are on a same side of the case.

23. The battery as claimed in claim 1, wherein structures of the first connection formation and second connection formation:
are complementary;
are on different sides of the case, and
are offset relative to a direction along which the first and second connection formations are to be connected to corresponding second and first connection formations.

* * * * *